US005907204A

United States Patent [19]

Matsushima et al.

[11] Patent Number: 5,907,204

[45] Date of Patent: May 25, 1999

[54] POWER SUPPLY TERMINAL STRUCTURE FOR STARTER MAGNET SWITCH

[75] Inventors: Keiichi Matsushima, Toyota; Masami Niimi, Handa; Tsutomu Shiga, Nukata-gun, all of Japan

[73] Assignee: Denso Corporation, Kariya, Japan

[21] Appl. No.: 08/826,510

[22] Filed: Apr. 3, 1997

[30] Foreign Application Priority Data

Apr. 4, 1996 [JP] Japan .................................... 8-082439
Apr. 4, 1996 [JP] Japan .................................... 8-082680

[51] Int. Cl.[6] ...................................................... H02K 11/00

[52] U.S. Cl. ........................ 310/68 C; 310/52; 310/68 R; 310/239; 310/245; 310/75 R; 310/89; 310/148; 290/38 R; 290/39

[58] Field of Search ................................ 310/68 C, 68 R, 310/68, 239; 361/105, 103; 337/363, 365

[56] References Cited

U.S. PATENT DOCUMENTS

| | | | |
|---|---|---|---|
| 4,157,525 | 6/1979 | Grable | 337/343 |
| 4,674,344 | 6/1987 | Kazino et al. | 310/68 C |
| 4,951,025 | 8/1990 | Finnegan et al. | 310/68 C |
| 5,291,085 | 3/1994 | Kawashima et al. | 310/68 C |
| 5,332,926 | 7/1994 | Ueno et al. | 310/68 C |
| 5,345,901 | 9/1994 | Siegenthaler | 123/179 |
| 5,497,286 | 3/1996 | Shimada et al. | 361/105 |
| 5,627,506 | 5/1997 | Suzuki | 337/298 |

FOREIGN PATENT DOCUMENTS

| | | | |
|---|---|---|---|
| 0 349 760 | 5/1989 | European Pat. Off. . | |
| 0 702 150 | 3/1996 | European Pat. Off. . | |
| 90 04 943 | 5/1991 | Germany | 310/68 C |
| 63-259160 | 10/1988 | Japan . | |
| 1-179176 | 12/1989 | Japan . | |
| 6-074778 | 9/1994 | Japan . | |
| 2 068 661 | 8/1981 | United Kingdom | 310/68 C |

OTHER PUBLICATIONS

Kazuhiro, Yamaguchi, "Magnet Switch", Journal Of Nippondenso Technical Disclosure, 60–099, Jul. 15, 1988.

Hiroaki Kudo, "Magnet Switch", Journal Of Nippondenso Technical Disclosure, 66–110, Jul. 15, 1989.

*Primary Examiner*—Elvin G. Enad
*Attorney, Agent, or Firm*—Cushman Darby & Cushman IP Group of Pillsbury Madison & Sutro LLP

[57] ABSTRACT

In a starter, a power supply terminal connected to a solenoid coil of a magnet switch and connectable to a starter external circuit is provided on an end cover. The power supply terminal includes a terminal metal member, a bimetal which interrupts electric conduction between the solenoid coil and the terminal metal member at the time of temperature rise above a predetermined temperature, and a casing contacting a foot part of the terminal metal member and encasing the bimetal therein. The bimetal responds to each of the excessive heating of the terminal metal member and excessive energization current to interrupt the conduction. In case of a single axis-type starter, the power supply terminal is provided on a recess so that the terminal metal member does not extend axially beyond the rear end face of the end cover.

27 Claims, 8 Drawing Sheets

POWER SUPPLY TERMINAL STRUCTURE FOR STARTER MAGNET SWITCH

CROSS REFERENCE TO RELATED APPLICATION

This application is based on and claims priorities of Japanese Patent Applications No. 8-82439 filed on Apr. 4, 1996 and No. 8-82680 filed on Apr. 4, 1996, the contents of which are incorporated herein by reference.

BACKGROUND OF THE INVENTION

1. Field of the Invention

The present invention relates to a power supply terminal which is connected to a solenoid coil of a magnet switch mounted in a starter and connectable to an external circuit of the starter. More particularly, the present invention relates to a power supply terminal which has an overheating suppressing mechanism or which is adapted for use in a single axis-type starter.

2. Description of Related Art

It is disclosed in Japanese Patent Publication (JP-B2) No. 6-74778 to detect, by a temperature sensor provided adjacently to a solenoid coil of a magnet switch, the excessive temperature rise of the solenoid coil and to interrupt electric power supply to a motor. In this magnet switch, a normally-closed bimetal and a temperature fusible link are shown exemplarily as the temperature sensor. As the temperature sensor is provided in contact with the solenoid coil of the magnet switch, an energization circuit can be interrupted in response to the excessive temperature rise of the solenoid coil but not in response to the temperature of a solenoid coil terminal itself.

Because large electric current flows to the power supply terminal of the magnet switch for a starter so that the solenoid coil is energized sufficiently to attract a plunger, conduction failure of the terminal leads to the temperature rise. The conduction failure occurs when the connection of the terminal with an external plug is loosened by vibrations, when the contact surface of the terminal is stained by water or dust or when the electric resistance of the contact surface or a connecting portion with an electrical lead wire is increased by rusting. Further, it often occurs that the terminal is connected too loosely or the external plug is improperly inserted for engagement with the terminal.

When the conduction failure occurs due to some of those reasons and the electric resistance increases, abnormal temperature rise occurs at the time of energization of the solenoid coil. Despite this fact, because the temperature sensor is provided apart from the terminal in the conventional magnet switch, the excessive temperature rise of the terminal itself cannot be detected and the above-described drawback cannot be obviated.

A single axis-type starter is proposed by Japanese Utility Model Publication Laid-open (JP-U) No. 1-179176. This single axis type starter has a speed reduction mechanism, a motor and a magnet switch which are all disposed axially in line. The reduction mechanism has a pinion disposed engageably with an engine ring gear through an output shaft. The motor is adjacently disposed at the axially rear side of the reduction mechanism to drive the reduction mechanism by a motor rotary shaft extended in the same direction as the output shaft. The magnet switch is adjacently disposed at the axially rear side of the motor to control electric power supply to the motor. The magnet switch is surrounded by an end cover having an opening facing an outer rear casing end of the motor.

As the starter radial length can be shortened by a distance the magnet switch is disposed at the rear side of the motor in the single axis-type starter, it is advantageous that it may be easily mounted, for instance, at the side of an engine block. The starter axial length is likely to be necessarily lengthened by the shortening of the radial length. This will cause some difficulty in assuring a required space for the starter and other equipment at the axially rear side of the starter in an engine compartment.

In the single axis-type starter, in particular, a power supply terminal for a solenoid coil of the magnet switch protrudes from the rear end surface of the end cover. Therefore, in the case that the rear side space of the magnet switch is reduced by the lengthening of the starter axial length, it becomes difficult to connect and disconnect an electric cable to and from the power supply terminal of the solenoid coil.

Further, the power supply terminal of the solenoid coil is usually narrow and soft. Therefore, the terminal may be damaged or bent in the case of dropping or hitting other equipment at the time of starter mounting work or cable connecting/disconnecting work. This makes it difficult to connect it with an external cable.

SUMMARY OF THE INVENTION

The present invention has been made in view of the above-described problems.

It is accordingly an object of the present invention to provide a power supply terminal for a magnet switch of a starter which has a function of detecting not only excessive temperature rise caused by the excessive energization of a solenoid coil but also excessive temperature rise at a contact portion between a terminal metal plate connected to the solenoid coil and a terminal of an external power supply cable as well as at a connection portion between these terminals and electric lead wires and interrupting energization of the solenoid coil.

It is another object of the present invention to provide a power supply terminal for a starter which is excellent in mountability in an engine compartment and terminal protection as well as connectability to a power supply terminal of a solenoid coil of a magnet switch.

According to the first aspect of the present invention, a terminal metal member connectable to an external circuit is electrically connected to a solenoid coil through interruption member which interrupts the electrical conduction or has such characteristics as its electric resistance becomes very high at above a predetermined temperature. The interruption member is a thermo breaker or a thermo fusible link. The interruption member is encased within a casing which is in contact with the terminal metal member. The interruption member is adapted to be responsive to only the overheating caused by the excessive current to the solenoid coil of the magnet switch but also the excessive temperature rise in the power supply terminal.

With the interruption member being encased within the power supply terminal as a unit, it can be mounted with ease at the time of assembling the power supply terminal. As a result, electric wiring can be reduced in comparison with the conventional mounting of the interruption means onto the side of the solenoid coil and assembling work hours can be reduced, resulting in the cost reduction.

Preferably the interruption member includes a normally-closed bimetal so that the energization current can be supplied to the interruption member through a smaller electric resistance in the normal temperature range. Further, with the small heat capacity, the overheating of the power supply terminal can be detected more quickly and the energization current can be interrupted.

Preferably, a casing is in contact with the terminal metal member so that the heat is conducted quickly from the terminal metal member to the casing when the terminal metal member overheats. Further, the interruption member is sealed within the casing and the heat is not dissipated so that the temperature of the interruption means quickly rises.

Preferably, at least a part of the casing encasing the interruption member is formed by the terminal metal member.

Preferably, at least a part of the terminal metal member is encased in the casing.

Preferably, one end of a heat conductive member made of metal and having a high heat conductivity is in contact with either one of the solenoid coil, its bobbin and a magnetic circuit member, while the other end is supported within the casing encasing the interruption member. The electric current to the solenoid coil can be interrupted in response to not only the excessive current but also the temperature of the solenoid coil, bobbin, the magnetic circuit member or the like so that the safety is enhanced much more.

According to the second aspect of the present invention, a power supply terminal is provided on a recessed part of an end cover of a single axis-type starter. The length of a terminal metal member is restricted not to extend beyond the axial end face of the end cover.

BRIEF DESCRIPTION OF THE DRAWINGS

Other objects, features and advantages of the present invention will become more apparent from the following detailed description when read with reference to the accompanying drawings, in which.

DETAILED DESCRIPTION OF THE PRESENTLY PREFERRED EMBODIMENT

A power supply terminal for a magnet switch of a starter according to the present invention will be fully described with reference to the following embodiments.

[First Embodiment]

Figure 1:
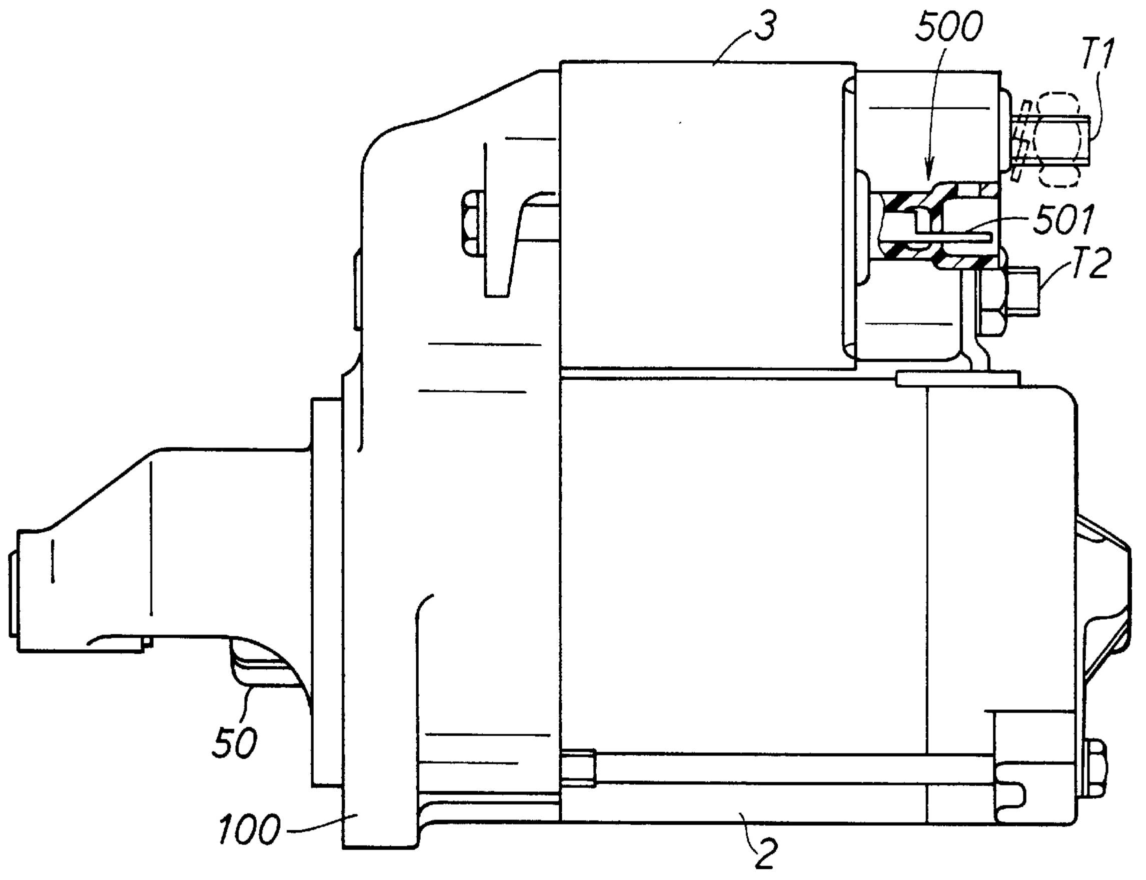
FIG. 1 is a side view of a starter having a power supply terminal according to the first embodiment of the present invention.

As shown in FIG. 1, a starter is constructed by a motor 2, a magnet switch 3, a housing 100 and the like to start an engine (not shown) by rotating a pinion gear 50 provided near the front end (left side in the figure).

A power supply terminal 500 for the magnet switch 3 is mounted on the rear end (right side in the figure) of the magnet switch 3 equipped on the starter motor 2. The power supply terminal 500 is electrically connected to a solenoid coil (not shown) in the magnet switch 3 and is connectable to an external circuit of the starter. At the rear end (right end in the figure) of the magnet switch 3, a main terminal T1 and a connecting terminal T2 are so provided as stepped from the power supply terminal 500.

Figure 4:
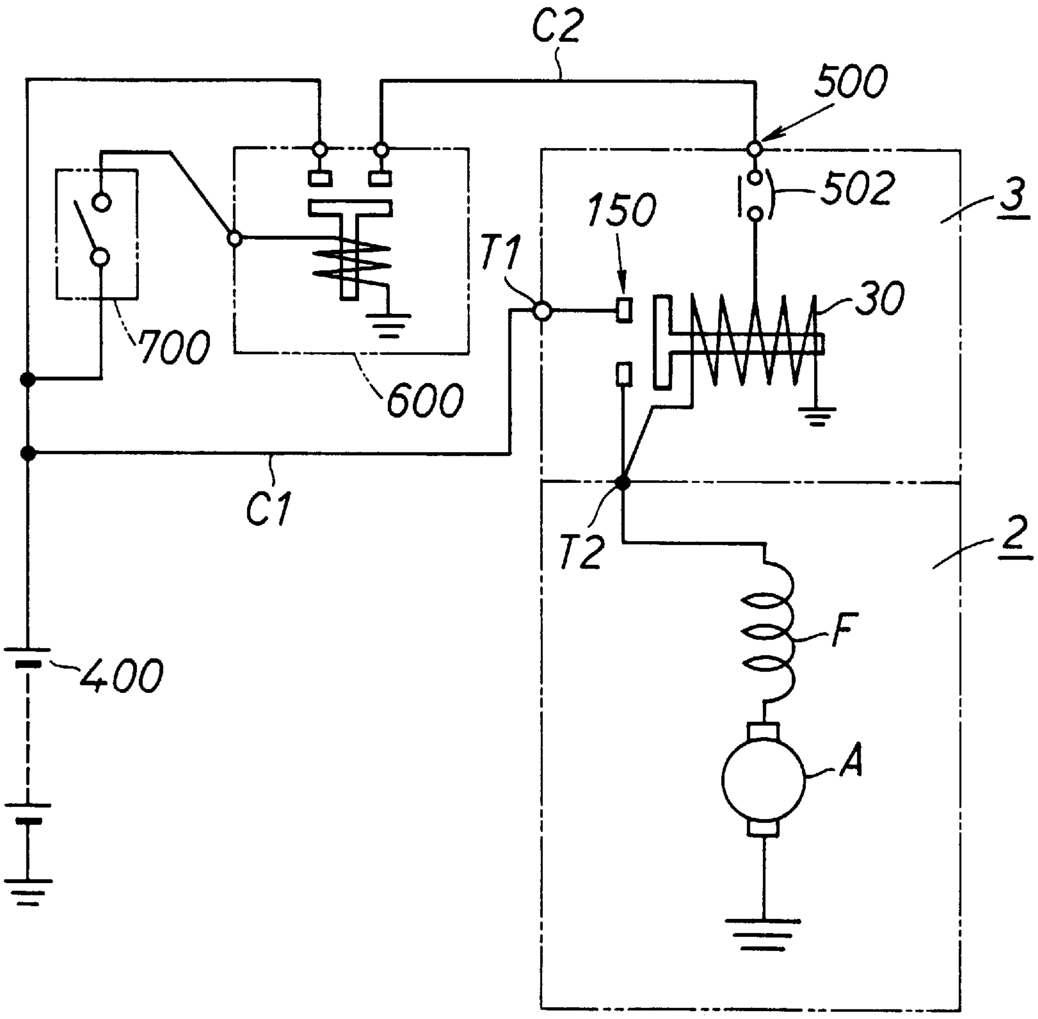
FIG. 4 is a circuit diagram of an starter system to which the first embodiment is applied.

As shown in FIG. 4, the main terminal T1 is connected to a battery cable connected to a battery 400, while the connecting terminal T2 is connected to a connecting lead wire connected to the motor 2 including a field coil F and an armature A. The terminals T1 and T2 are terminals which form a part of a main circuit C1.

In the magnet switch 3, a solenoid coil 30 is provided so that the solenoid coil 30 attracts a plunger by the magnetic force when electric current is supplied from the power supply terminal 500. The plunger is linked with a main switch (not shown) and a driving lever (not shown). When the power supply terminal 500 is supplied with the electric current and the solenoid coil 30 attracts the plunger by the magnetic force, the main switch linked therewith closes to conduct main current to the motor 2. At the same time, the pinion gear 50 is pushed forward (left side in the figure) through the driving lever linked with the plunger to engage with a ring gear of an engine (not shown) so that engine is rotated by the rotary power of the motor 2.

The power supply terminal 500 is a terminal at the side of the magnet switch 3 connecting the solenoid coil 30 of the magnet switch 3 and the external circuit which is a part of the switch circuit C2.

The switch circuit C2 is formed when a key switch 700 turns on and responsively a starter relay 600 closes. The solenoid energization current from the battery 400 flows into the solenoid coil 30 through the starter relay 600 and the power supply terminal 500. The main circuit C1, on the other hand, is connected from the battery 400 to the field coil F and the armature A of the motor 2 through a main switch 150 of the magnet switch 3. Therefore, during normal operation, no such current larger than that flowing in the main circuit C1 flows in the switch circuit C2 in which the power supply terminal 500 is provided. Even in the circuit configuration in which the starter relay 600 is not provided in the switch circuit C2 and one end of the key switch 700 is electrically connected directly to the power supply terminal 500, the power supply terminal 500 will operate without any trouble.

Figure 2:
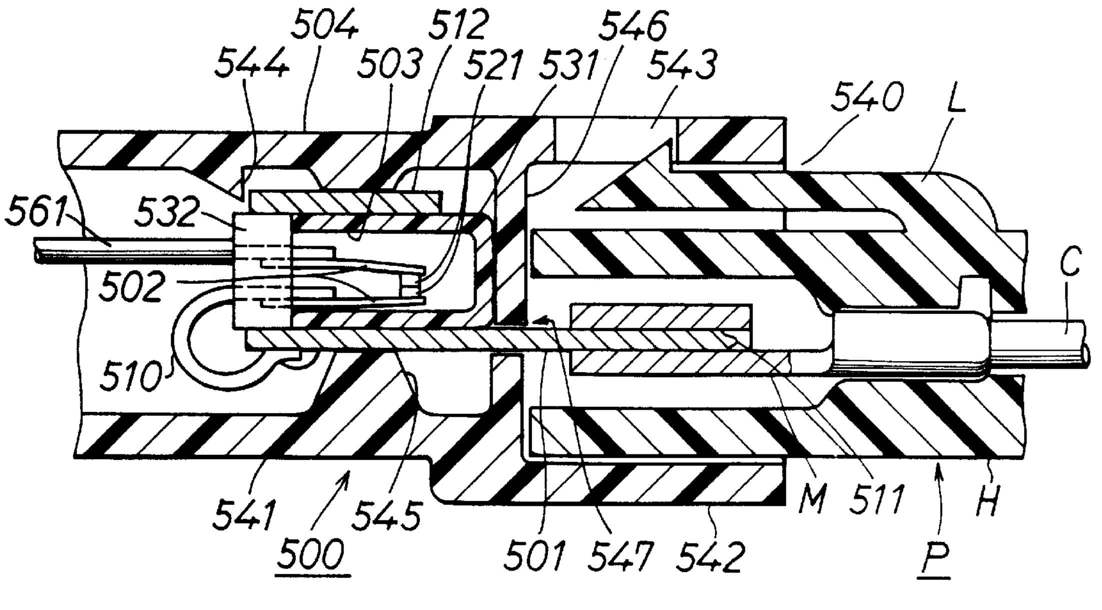
FIG. 2 is a side sectional view of the power supply terminal according to the first embodiment.

As shown in FIG. 2, the power supply terminal 500 has the terminal metal member 501, a normally-closed bimetal 502 which constitutes a thermo breaker, and an electrically insulating resin casing 503 which encases the bimetal 502, and is supported within an electrically insulating resin holder 504. The power supply terminal 500 is shown in a condition that an external plug P electrically connected to the external switching circuit C2 (FIG. 4) is engaged therewith.

The terminal metal member 501 is a metal plate made of electric conductor such as a copper alloy, and comprises a flat plate-shaped top end part 511 extending toward the plug P and a foot part 512 which circumferentially surrounds the casing 503 generally entirely to clamp the casing 503 therein. The terminal metal member 501 which is made of an electrically good conductive material is connected to the wiring end 561 of the solenoid coil 30 within the magnet switch 2 through the normally-closed bimetal, and is connected to the external circuit through its top end part 11 and a mating metal M of the plug P.

The normally-closed bimetal 502 have a pair of bimetal elements which oppose each other and have respective contact members 521 joined on the top ends and contacting each other. The normally-closed bimetal 502 is supported in the casing 3 by a holder part 532 of the casing 503. Of the pair of bimetal elements, one is connected to the solenoid coil 30 (both a pull-in coil and a holding coil are shown in FIG. 4) with its winding end 561 being joined thereto and the other is connected to the terminal metal member 501 through an electric conductor 510.

As the contact members 521 of the bimetal 502 are in contact with each other under the normal temperature condition, the terminal metal member 501 and the solenoid coil 30 are in electric conduction. When the temperature of the bimetal 502 rises above a predetermined temperature, i.e., overheating temperature, the bimetal 502 warp and the contacts 521 disengages from each other so that the electric conduction between the solenoid coil 30 and the terminal metal member 501 is interrupted. The operating temperature of the bimetal 2 which interrupts the electric conduction may be set as desired but is set preferably to 120 through 180° C. The casing 503 comprises a heat resisting resin-made main body part 531 opening at one end to form an inner space and the electrically insulating resin-made holder part 532 closing the opening of the main body part 531. The main body part 531 encases the bimetal 502 within its inner space, and the holder part 532 fixedly supports the root parts of the bimetal 502. The main part 531 and the holder part 532 are joined to each other.

Figure 3:
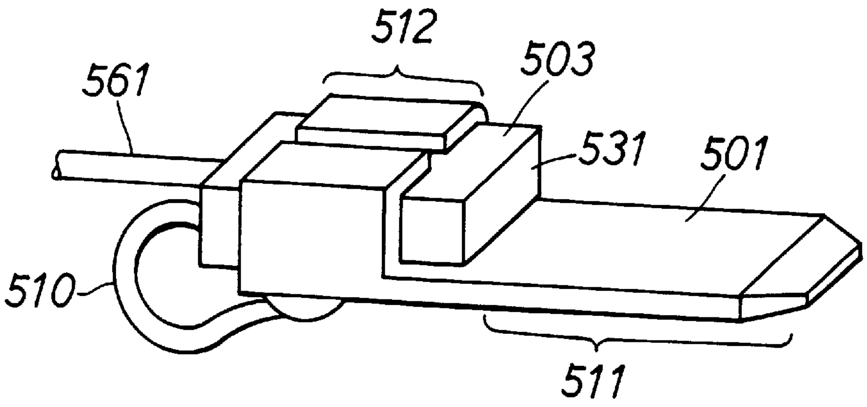
FIG. 3 is a perspective view of the power supply terminal according to the first embodiment.

As shown in FIG. 3, the foot part 512 of the terminal metal member 501 curls around the casing 503 so that the terminal metal member 501 and the casing 503 are fixed integrally to each other.

The terminal metal member 501 and the casing 503 are, as shown in FIG. 2, fixedly supported within the inner space of the electrically insulating resin-made holder 504. That is, the holder 504 comprises a tubular base part 541 and a connecting part 542. The foot part 512 of the terminal metal member 501 and the casing 503 are housed and fixed within the inner space of the base part 541. The terminal plate member 501 and the casing 503 are fixed in position in the longitudinal position (right-and-left direction in the figure) by a partition wall 546 and a support part 544 formed by the radially inward protrusion of the inner wall of the base part 541. It is also fixed in position in the other directions by holder part 545 formed by the radially inwardly protruding circumferential protrusion of the inner wall of the base part 541.

On the other hand, the top end part 511 of the terminal metal member 1 protrudes from a through hole 547 of the partition part 546 into an insertion opening 540 which is a recess formed in the connecting part 542. with the plug P connected to the external circuit being inserted into the insertion opening 540, the top end part 511 is fitted with the curled opposing metal M to be in electric conduction with the cord C through the opposing metal member M. A plug holder H holding the opposing metal member M and the top end of the cord C is inserted and fitted in the insertion hole 540. A hook part L branching resiliently from the plug holder H is engaged in an engagement hole 543 opening in the side wall of the terminal holder connecting part 542 so that the plug P may not be disengaged unexpectedly from the power supply terminal 500.

According to the power supply terminal 500 for the magnet switch 3 of the starter, the terminal metal member 501 connectable to the external switch circuit (energization circuit) C2 is electrically conducted to the solenoid coil 30 through the normally-closed bimetal 502. As described above, the normally-closed bimetal 502 becomes nonconductive at above the predetermined temperature and thereafter restores the conduction when the temperature falls.

The bimetal 502 are encased within the casing 503 which is in tight contact with the foot part of the terminal metal member 501 at its four sides. Therefore, such a drawback is prevented beforehand that the temperature of the bimetal does not rise sufficiently and the bimetal 502 does not operate due to heat dissipation to a surrounding area when the temperature of the terminal metal member 501 rises by the overheating.

The cases in which the normally-closed bimetal 502 operates to interrupt the electric conduction to the solenoid coil 30 is divided generally into the following two cases.

The first case is when the excessive current flows to the solenoid coil 30. The excessive current means any of an excessively large current in magnitude and a current flowing for an excessively long period of time. In those instances, an excessive temperature rise will occur in the solenoid coil 30 or a shorted part and the temperature of the bimetal 502 will also rise by the Joule heat because of its own electric resistance. In this instance, as the bimetal 502 is sealed in the casing 503, the Joule heat is maintained within the casing 503 and is restricted from dissipating to the outside of the casing 503 so that the temperature of the bimetal 502 rises quickly. As a result, the bimetal 502 operates to interrupt the electric current to the solenoid coil 30 so that the continued overheating is avoided and the resulting drawback is prevented beforehand.

The advantage of this embodiment is that the bimetal 2 operates by detecting the excessive current flowing to the solenoid coil 30 as opposed to the case that the energization of the solenoid coil is interrupted by detecting the temperature of only a specified part around the solenoid coil. That is, even in the case that the excessive current flows (due to short-circuiting or the like) at a part other than the specified part, the excessive current can be detected without fail by the Joule heat generated by the bimetal 2 and the bimetal 2 responsively operates to interrupt the solenoid energization current. Therefore, the starter which has the power supply terminal 500 has a higher safety.

The second case is that the excessive heating occurs in the power supply terminal 500 itself or its surrounding area for some reason and the temperature of the power supply terminal 500 itself rises to an excessively high temperature. In this instance, the bimetal 502 mounted in the power supply terminal 500 is heated and its temperature rises to interrupt the current flowing to the solenoid coil 30. As a result, because the current supply as a heat energy source is stopped, any damage caused by the heat of the power supply terminal 500 and of its surrounding area can be prevented beforehand.

Here, the heat generation in the power supply terminal 500 will arise mostly from the failure of electric conduction (insufficient electric conduction) between the top end part 511 which is the connecting part of the terminal metal member 501 and the opposing metal member M. In this instance, though the terminal metal member 501 heats up first, the heat is conducted quickly to the bimetal 502 in the casing 503 because the foot part 512 of the terminal metal member 501 curls around the casing 503 encasing the bimetal 502 and is in contact with the casing 503. Further, with the bimetal 502 being sealed within the casing 503, the bimetal 502 will not be cooled by the external air and the response of operation of the bimetal 502 will not delay. As a result, the temperature of the bimetal 502 quickly rises as well and reaches its operation temperature to assuredly prevent the drawback caused by overheating around the power supply terminal 500.

Therefore, according to the power supply terminal 500 not only the overheating caused by the excessive current to the solenoid coil 30 of the magnet switch 3 can be detected but also the excessive temperature rise in the power supply terminal 500 can be detected. In either case, because the electric conduction to the solenoid coil 30 is interrupted, a continued overheating can be prevented and any drawback arising from the overheating can be prevented beforehand. As a result, the safety of the starter equipped with the magnet switch 3 is more advantageously enhanced.

In addition to the above-described advantages, with the bimetal 2 being encased within the casing 503 as a unit, it can be mounted with ease at the time of assembling the power supply terminal 500. Further, as the bimetal 502 is integrated with the terminal metal member 501, it can be assembled into the holder 504 with ease. As a result, electric wiring can be reduced in comparison with the conventional mounting of the solenoid coil energization interruption member onto the side of the solenoid coil and assembling work hours can be reduced, resulting in the cost reduction.

Further, with the interruption member being the normally-closed bimetal 502, the electric resistance is restricted from rising excessively high during the normal temperature range and a sufficient current can be supplied to the solenoid coil 30. Further, with the bimetal 502 having a small heat capacity, the overheating of the power supply terminal 500 can be detected more quickly and the energization current can be interrupted, resulting in much higher safety.

(Modifications of the First Embodiment)

First, although the normally-closed bimetal 2 is used to interrupt the solenoid coil energization, it may be modified to use a PTC thermistor alternatively. With the PTC thermistor, erroneous operation can be reduced even in the harsh environment and a higher reliability can be attained. Due to the fact that PTC thermistors have the least variations in the resistances from element to element under the normal temperature, it is advantageous that the uniform quality can be expected. Further, as the PTC thermistor increases the electric resistance to self-heat and reach the operation temperature quickly, the electric current to the solenoid coil can be interrupted or reduced more quickly. This provides an advantage of higher safety as well. As the self-heating is promoted and its resistance increases when the excessive current flows, it becomes possible to protect the switch circuit C2 by the current limiting effect. Further, as the PTC thermistor is a solid state element and can be easily mounted in the power supply terminal 500, assembling work hours can be reduced.

Secondly, for the solenoid coil interruption, a thermo fusible link (temperature fusible link) may be used as well. The thermo fusible link melts or breaks by melting its conductor at a predetermined temperature to interrupt the electric conduction. Once the electric conduction is interrupted by the thermo fusible link, on the other hand, it does not restore the conduction even when it is cooled and the temperature falls. Therefore, it is necessary to replace the thermo fusible link by a new one after removing the cause of the overheating. As the thermo fusible link can be provided in low cost generally, a further cost-down can be attained in the modification which uses the thermo fusible link.

Thus, it should be determined in consideration of various conditions such as use condition of the starter whether the thermo breaker which restores its conduction after cooling or the thermo fusible link which does not restore its conduction is to be mounted in the power supply terminal 500.

[Second Embodiment]

Figure 5:
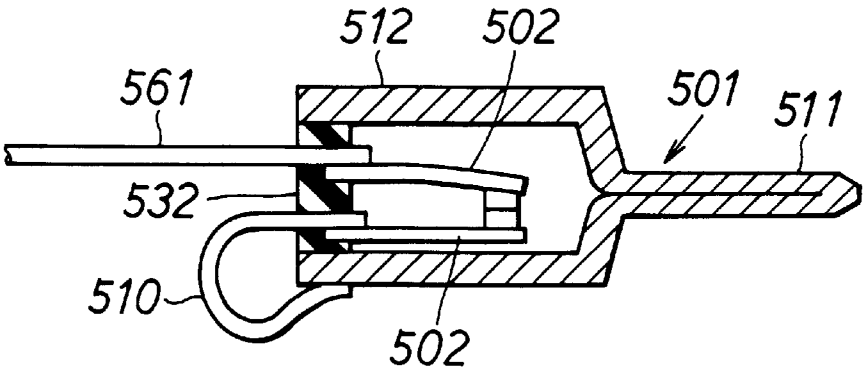
FIG. 5 is a partial side sectional view of a power supply terminal according to the second embodiment.

According to the second embodiment, as shown in FIG. 5 in cross section, the terminal metal member 501 is formed by folding a metal plate into two layers and its foot 512 is used as a casing main body. That is, the top end part 511 of the terminal metal member 501 is formed by the folding of the metal plate at the top end part, and the foot part 512 integral therewith is formed by expanding the two-folded metal plate and providing two opposing parallel parts. The holder part 532 which forms the casing bottom is sandwiched and fixed between the end parts of both of the foot parts 512. The holder part 532 holds between the foot parts 512 the pair of normally-closed bimetals 502 similar to those in the first embodiment. One of the elements of the bimetal 512 is connected to the terminal metal member 501 through the conductor 510, whereas the other element is connected to the winding end 561 of the solenoid coil 30 (not shown). The terminal metal member 501, bimetal 502 and the holder part 532 are held in the electrically insulating resin-made holder 504 (not shown) and attached as the power supply terminal to the magnet switch of the starter.

According to the second embodiment, the two parallel foot parts 512 of the terminal metal member 501 hold the bimetal 502 in the space therebetween, and-the terminal metal member 501 forms the casing one side of which is open. Therefore, in the case that the terminal metal member 501 overheats, the temperature of the bimetal 502 rises very quickly and interrupts the electric current to the solenoid coil 30 (not shown).

Thus, the response of the bimetal 2 relative to the overheating of the power supply terminal 500 is much quicker than in the first embodiment. It is advantageous that the damage which the overheating of the power supply terminal would cause will be more assuredly avoided.

(Modifications of the Second Embodiment)

First, the foot parts 512 of the terminal metal member 501 may be formed another side wall parts so that those side wall parts cover the open sides of the bimetal 502 when assembled as shown in FIG. 5.

According to this modification, as the bimetal 502 is generally sealed by the foot parts 512 of the terminal metal member 1, the heat is conducted in a shorter time and the response characteristics can be improved more.

Figure 6:
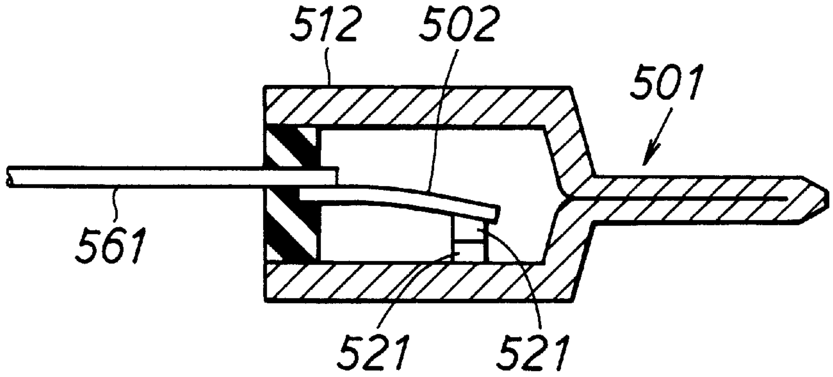
FIG. 6 is a partial side sectional view of a power supply terminal according to a modification of the second embodiment.

Secondly, as shown in FIG. 6, the conductor 610 connected to the terminal metal member 501 of the second embodiment and one of the elements of the bimetal 502 connected to the conductor 10 are eliminated. One contact member 521 of the bimetal 502 is joined and fixed to the inner face of the foot part 512. The contact member 521 formed at the top end of the remaining element of the bimetal 502 to which the winding end part 561 is connected to be normally in contact with the contact member 21 which is joined to the foot part 512.

According to this modification, the number of component parts and assembling work hours are reduced for the further cost-down.

Figure 7:
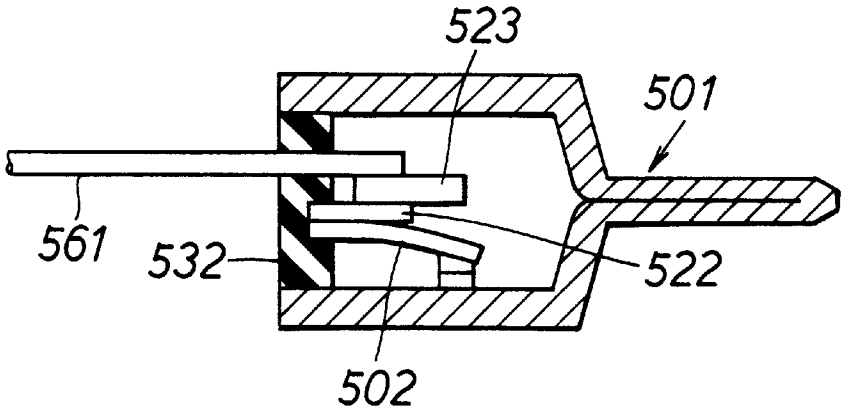
FIG. 7 is a partial side sectional view of a power supply terminal according to another modification of the second embodiment.

Thirdly, as shown in FIG. 7, a heat generating element 523 may be sandwiched between a conductor member 522 joined to the bimetal 502 and the end part of the winding end part 561 of the solenoid coil 30. The heat generating element 523 is an electric conductor having a predetermined electric resistance and operates, when the resistance of the bimetal 2 is too small to assure the sufficient amount of heat generation relative to the excessive current, to compensate for the heat generation and raise the temperature of the bimetal 502. As a result, the electric conduction is interrupted more quickly at the time of excessive heat generation and higher safety is assured.

Provided that a PTC thermistor is used as the heat generating element 523, the resistance increases with the rise of the temperature or the voltage. The amount of heat generation increases more as the excessive current flows or the temperature of the power supply terminal excessively rises. As a result, the temperature of the bimetal 502 rises more quickly and interrupts the conduction to protect the electric circuit for much higher safety.

Further, in the same manner as in the first embodiment, the normally-closed bimetal 502 may be replaced by the PTC thermistor or the thermo fusible link.

[Third Embodiment]

Figure 8A:
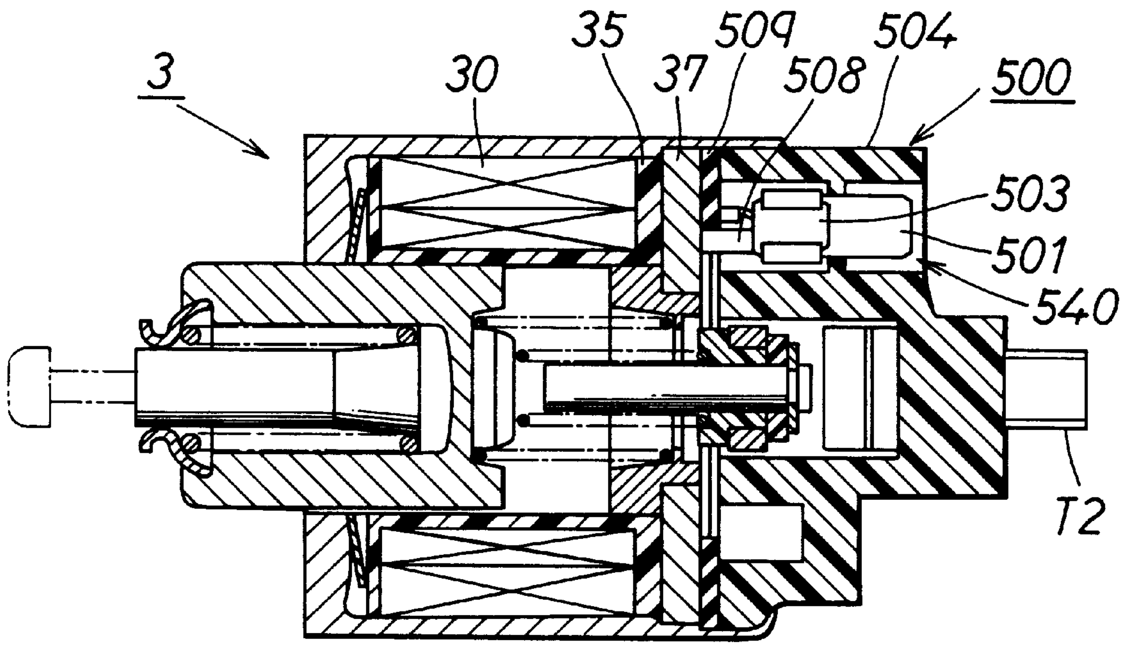
FIGS. 8A and 8B are a sectional view of a magnet switch and a rear view of the same according to the third embodiment, respectively.
Figure 8B:
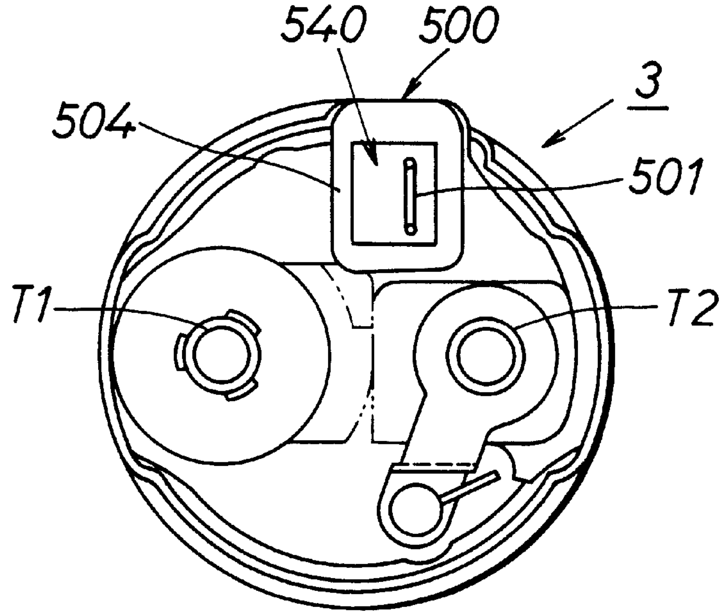

As shown in FIGS. 8A and 8B, the power supply terminal 500 for the magnet switch of the starter has a heat conductive member 508 which conducts heat of a ground plate 37, which is a magnetic circuit member, to the bimetal 502 (not shown) encased in the casing 503 of the power supply terminal 500.

In the magnet switch 3, the solenoid coil 30 is wound around a resin-made bobbin 35 to which the ground plate 37 is fixed adjacently. The solenoid coil 30 and the power supply terminal 500 are separated by an electric insulating partition disk 509. Therefore, conduction of the heat generated by the solenoid coil 30 to the power supply terminal 500 is limited without special arrangement it is difficult to detect the temperature of the solenoid coil 30 by the power supply terminal 500. The ground plate 37, however, is positioned adjacently to the solenoid coil 30 and its bobbin 35. The plate 37 is generally made of a high heat conductive metal because of the requirement for soft magnetism.

Figure 9:
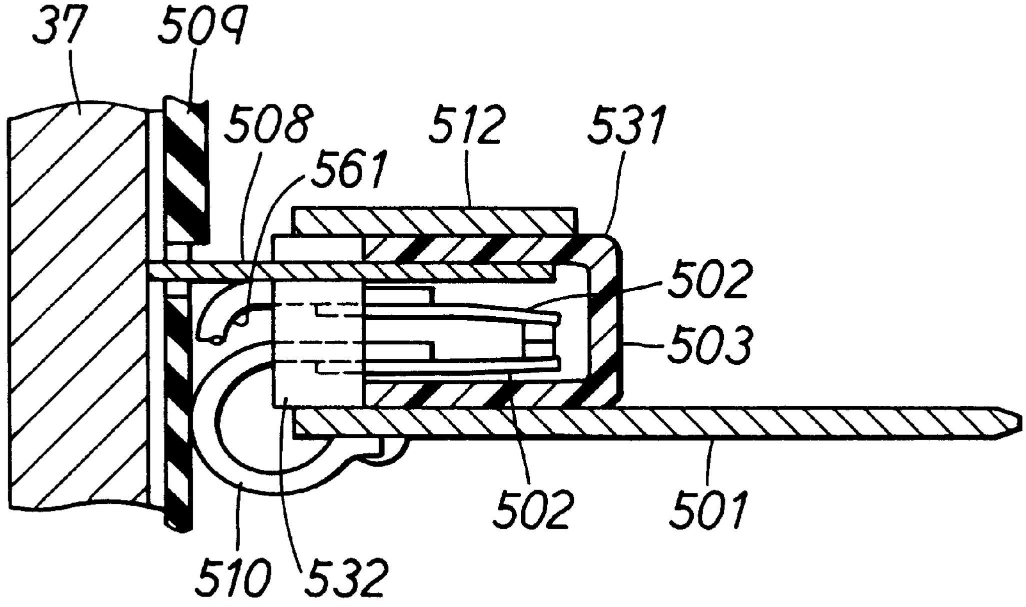
FIG. 9 is a partial sectional view of a power supply terminal according to the third embodiment.

In this power supply terminal 500, as shown in FIG. 9 in more detail, a heat conductive member 508 one end of which is in direct contact with the ground plate 37 and the other end of which is held within the casing 503 is provided. The member 508 is made of a copper alloy. The holder part 532 passes therethrough and fixedly holds the heat conductive member 508. The partition disk 509 is formed a through hole for passing the heat conductive member 508 therethrough. The other construction including the wiring end 561 and the conductor 510 is the same as that of the power supply terminal 500 of the first embodiment.

According to this embodiment, one end of the heat conductive member 508 made of the high heat conductive copper alloy is in contact with the ground plate 37 which is adjacent to the solenoid coil 30, and the other end is held within the casing 503 encasing the bimetal 502. Therefore, when the solenoid coil 30 overheats, the heat is conducted quickly from the solenoid coil 30 to the power supply terminal 500 through the heat conductive member 508. The temperature of the bimetal 502 rises and operates to interrupt the current to the solenoid coil 30. As a result, the bimetal 502 responds to not only the excessive current flowing therethrough but also the temperature of the solenoid coil 30 and its surroundings.

According to this embodiment, therefore, the current to the solenoid coil 30 can be interrupted in response to not only the excessive current but also the temperature of the solenoid coil 30 and the ground plate 37 themselves with regard to the overheating of the solenoid coil 30. This is advantageous in that the safety is enhanced more highly.

(Modification of the Third Embodiment)

Although the heat conductive member 508 is in contact with the ground plate 37 only at one end thereof in the third embodiment, it may be modified such that the end part is bent to have a sufficient contact area to receive sufficient heat conduction from the ground plate 37. Alternatively, the ground plate 37 may be modified to have a hole for receiving the heat conductive member 508. Further, the hole may be formed as a through hole so that the one end of the heat conductive member 508 reaches the bobbin 35. According to those modifications, the current to the solenoid coil 30 can be interrupted more quickly in response to the overheating of the solenoid coil 30.

Still further, in the same manner as in the first embodiment, it may be so modified as that the normally-closed bimetal 502 is replaced by the PTC thermistor or the thermo fusible link.

[Fourth Embodiment]

Figure 10:
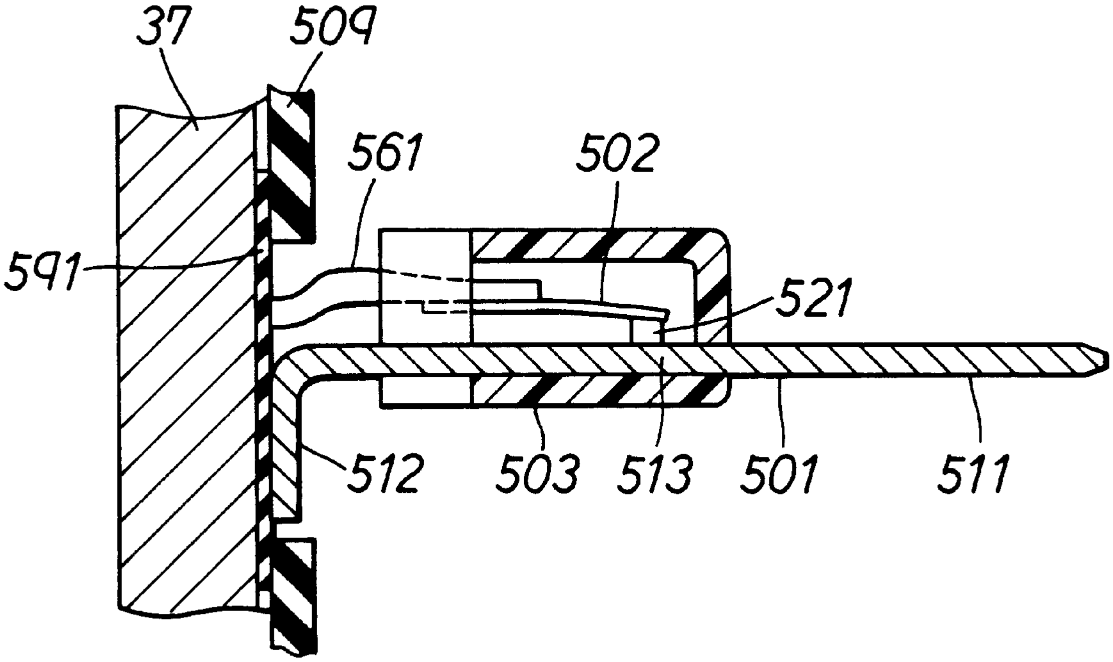
FIG. 10 is a partial sectional view of a power supply terminal according to the fourth embodiment.

As shown in FIG. 10, the power supply terminal 500 for the magnet switch 30 is characterized most in the terminal metal member 501. That is, the straight intermediate portion 513 of the terminal metal member 501 is encased within the casing 503, and the foot part 512 of the terminal metal member 501 is bent to contact with a wide area of the ground plate 37 through a thin insulating sheet 591.

In addition, the entire construction including the bimetal 502 is simplified. That is, the bimetal 2 uses only one bimetal element. As the contact part 521 is in direct contact with the terminal metal member 501 under normal temperatures, such a component part as the conductor used in the first embodiment need not be used for simplicity of construction. The terminal metal member 501 operates also as the heat conductive member used in the third embodiment (FIG. 9) and the construction is simplified in this respect. As the terminal member 501 is formed by simply bending in an L-shape, machining is simplified. Further, as the terminal metal member 501 which receives pressing force at the time of insertion of the plug is in contact with the ground plate 37 at its foot part 512, a very strong and solid construction is provided from the standpoint of dynamics.

As the intermediate part 513 of the terminal metal member 501 is housed within the casing 503, the temperature of the bimetal 502 within the casing 503 rises very quickly to interrupt the current to the solenoid coil 30 when the terminal metal member 501 overheats at the top end part 511 or the like. Therefore, the response of the bimetal 502 to the overheating of the terminal metal member 501 is very quick and it is advantageous that the damage of the power supply terminal 500 caused by the overheating of the terminal metal member 501 can be prevented assuredly.

As the foot part 512 of the terminal metal member 501 is in contact with the ground plate 37 through the insulating sheet 591, the heat of the solenoid coil 30 is conducted into the casing 503 as in the third embodiment. Therefore, as the bimetal 502 operates quickly to interrupt the energization current when the solenoid coil 30 overheats, the safety is improved as in the third embodiment.

(Modification of the Fourth Embodiment)

It is also possible in this embodiment that the normally-closed bimetal is replaced by a PTC thermistor or a thermo fusible link.

[Fifth Embodiment]

Contrary to the starter according to the above-described first to fourth embodiments, the starter according to this embodiment is constructed as a single-axis-type.

Figure 11:
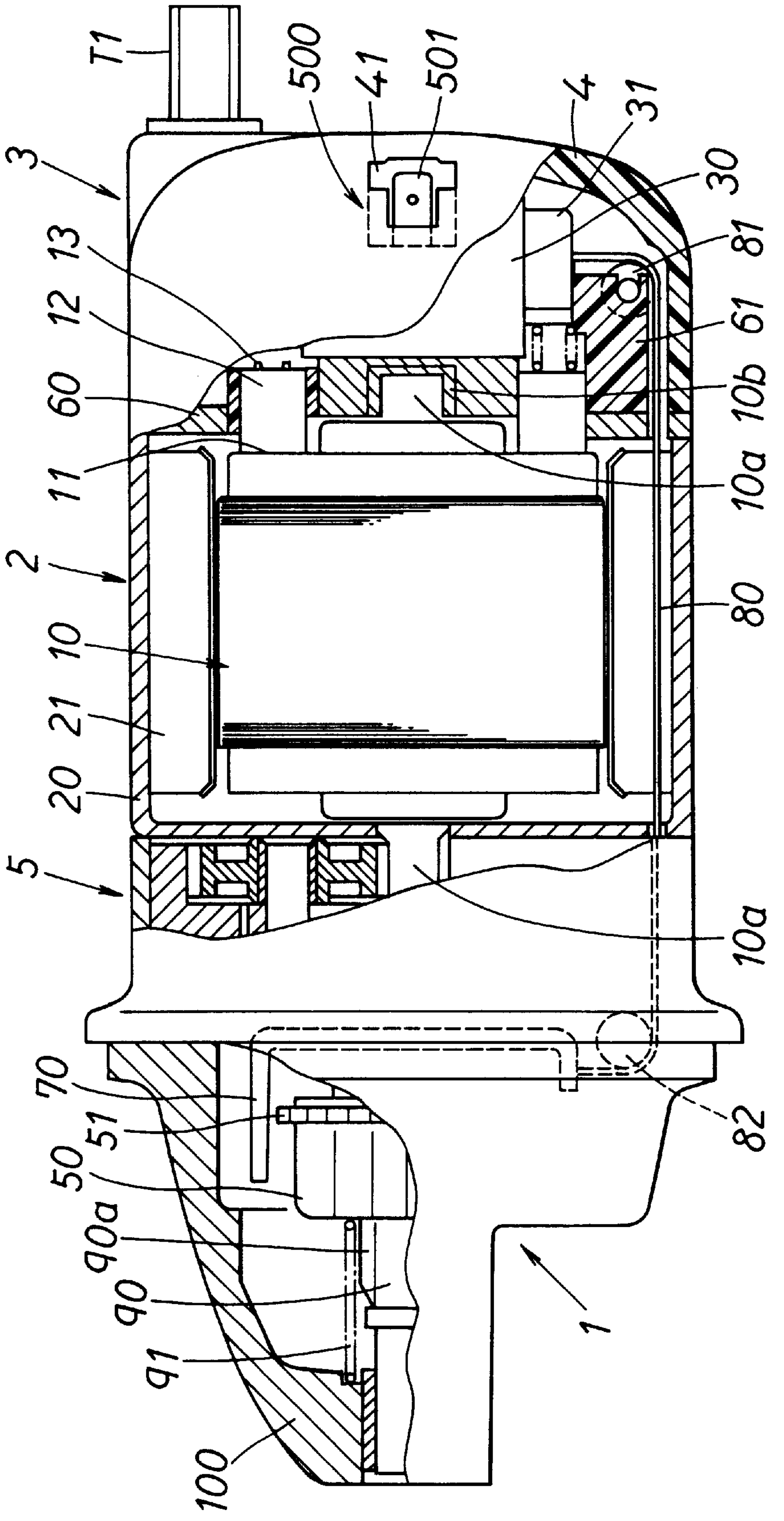
FIG. 11 is a side view of a starter according to the fifth embodiment with its main part being shown in cross section.

As shown in FIG. 11, a speed reduction mechanism 1, a motor 2 and a magnet switch 3 are disposed in the named order from the axially front side (left side in FIG. 11) to the rear side. The reduction mechanism 1 has a pinion 50 disposed engageably with an engine ring gear (not shown) and a planetary gear reduction mechanism 5 which drives the pinion 50 through an output shaft 90 which is in line with a rotary shaft 10*a* of the motor 2. The magnet switch 3 has a function of controlling power supply to the motor 2 and generating a driving force which regulates rotation of the pinion 50, and is surrounded by an end cover 4.

In more detail, the motor 2 is a permanent magnet field type direct current motor, which has a bottomed cylindrical yoke 20 formed by a soft steel plate and magnetic poles 21 formed by a plurality of permanent magnets fixed onto the inner circumferential surface of the yoke 20. The motor 2 further has an armature 10 disposed rotatably radially inside the magnetic poles 21 and the rotary shaft 10*a*. Brushes 12 are biased by respective springs 13 to be in slidable contact with a commutator surface of the armature 10.

A holder plate 60 closes the rear end opening of the yoke 20, holds a bearing 10*b* which supports the rotary shaft 10*a*, and holds the plurality of brushes 12 axially slidably. The springs 13 bias the brushes 12 to the commutator surface 11. A resin pedestal 61 is fixed to the rear end surface of the holder plate 60, and a solenoid coil 30 of the magnet switch 3 is fixed on the pedestal.

The reduction mechanism 1 has a housing 100 fixed to the front end of the yoke 20. The planetary gear reduction mechanism 5 is disposed in the housing 100 at a position adjacent to the front end of the yoke 20 so that the rotating force of the armature 10 is transmitted to the output shaft 90 through the planetary gear reduction mechanism 5. The both axial ends of the output shaft 90 are supported rotatably by the housing 100 and a support member (not shown), and the pinion 50 is fitted on the outer periphery of the output shaft 90 axially slidably through a helical spline 90*a*. A plurality of projections 51 is formed radially outwardly on the rear end of the pinion 50. A return spring 91 biases the pinion 50 in the rearward direction. A pinion rotation regulating member 70 is held within the housing 100 to be movable generally perpendicularly to the output shaft 90 so that it engages the projections 51 at the rear end of the pinion 50 and regulates the rotation of the pinion 50.

The construction and operation of the starter having the planetary gear reduction mechanism 5 are known well in the art. Therefore, further description is omitted for brevity.

In the magnet switch 3, a plunger 31 is disposed in the inner periphery of the solenoid coil 30 to be slidable perpendicularly to the rotary shaft 10*a*. The bottom end of the plunger 31 is connected to the bottom end of the pinion regulating member 70 through a wire (connecting member) guided by pulleys 81 and 82. Any other transmission members, such as a crank bar, which transmits movement of the plunger 31 to the pinion rotation regulating member 70 may be used alternatively. The plunger 31 is constructed to drive a movable contact of a switch (not shown) disposed above the solenoid coil 30. The movable contact (not shown) which is driven up and down connects to and disconnects form a fixed contact (not shown) to open and close the switch.

The end cover 4 is made of a resin (e.g., phenol resin in this embodiment) and is fixed to the yoke 20 by vises 110 (FIGS. 12 and 13) sandwiching the circumferential peripheral portion of the holder plate 60 together with the opening end portion of the yoke 20, thus surrounding the magnet switch 3. A main terminal (battery terminal) T1 protrudes rearwardly from the outside end surface of the end cover 4 and fixed to the end cover 4 by a caulking washer. A connector (power supply terminal) 500 having a terminal metal member 501 is provided on the end cover 4.

Figure 12:
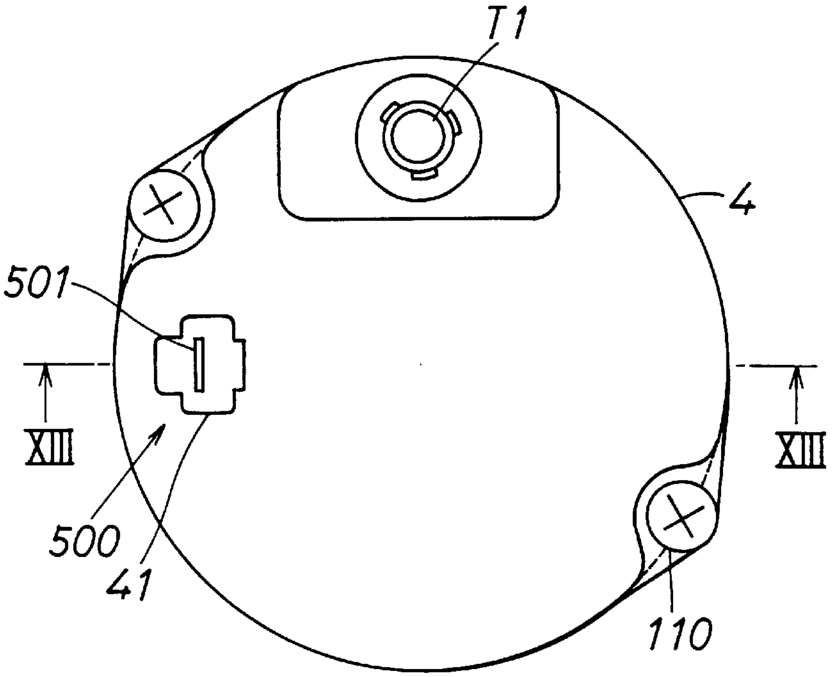
FIG. 12 is a front view of an end cover of the starter according to the second embodiment.
Figure 13:
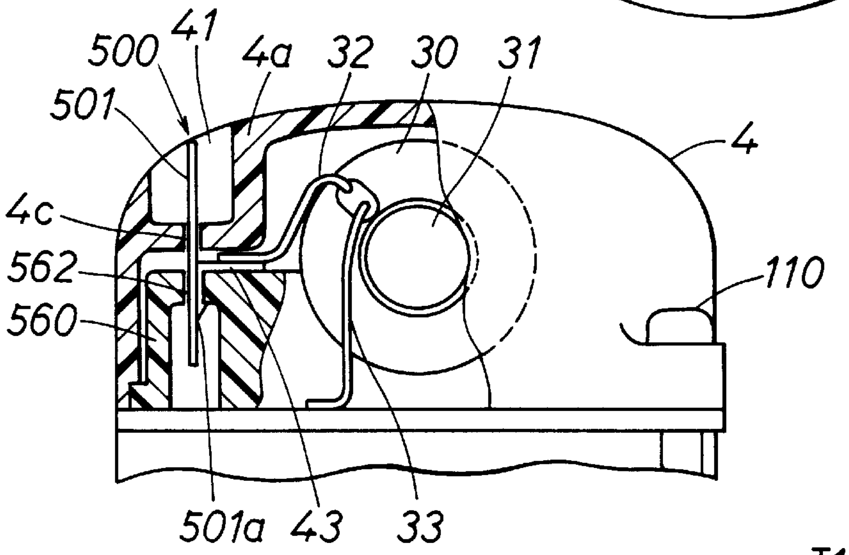
FIG. 13 is a partial sectional view taken along the arrow line XIII—XIII in FIG. 12.

As shown in FIGS. 12 and 13 in more detail, the power supply terminal 500 has a recess part 41 which is formed by recessing concavely a rear end wall 4*a* of the rear end cover 4*a* in the axial direction, and a solenoid coil terminal metal member 501 which extends in the axial direction passing through a slit 4*c* formed in the bottom of the recess part 41 of the rear end wall 4*a*.

The top end of the terminal metal member 501 made of a narrow thin copper plate is disposed axially more inside of the rear end wall 4*a* of the end cover 4 which defines the recess part 41. Thus, damage to or deformation of the terminal metal member 501 can be prevented effectively even at the time of hitting other equipment and falling of the starter. The damage or deformation will also be suppressed to some extent even in the case the solenoid coil terminal member 501 protrudes a certain length (e.g., less than ⅓ of the entire length). To maximize the terminal protection effect, it is only necessary that the terminal metal member 501 does not protrude axially outwardly from the lid-like virtual plane which is tangential to the rear end wall of the end cover 4 defining the entire circumferential periphery of the recess part 41.

The inside end of the terminal metal member 501 is joined to an L-shaped metal plate 43 and is inserted together with the L-shaped metal plate 43 into a slit 562 formed in a resin-made pedestal. A reversed hook 501*a* is provided on the end of the terminal metal member 501. The L-shaped metal plate 43 and the reversed hook 501*a* pinch the wall part of the pedestal 61 to restrict axial displacement of the terminal metal member 501. The L-shaped metal member 43 is connected to one lead wire 32 of the solenoid coil 30 and the other end of a lead wire 33 of the solenoid coil 30 is connected to the holder plate 60 which is a grounding plate.

In the present embodiment, as described above, the recess part 41 is formed on the end cover 4 at the position adjacent to the side of the solenoid coil 30 and the power supply terminal 500 is constructed by protruding the terminal metal member 501 from the bottom of the recess part 41. Therefore, the top end of the terminal metal member 501 does not protrude from the outside surface of the end cover 4, thus enhancing the mechanical protectability of the terminal metal member 501.

An external connector or plug (not shown) which is shaped to be fitted smoothly but tightly is press-inserted into the inside surface of the recess 41 so that it is held in stable posture by being restricted by the recess part 41. A power supply terminal provided in the external connector is connected to the terminal metal member 501 to supply the electric power to the solenoid coil 30.

The external connector may be fitted into the recess part 41 by sliding over the outside surface of the rear end wall of the end cover 4. Thus, connecting and disconnecting the external connector under various assembling environments is made very easy. Further, the unnecessary space existing at the side of the magnet switch 3 disposed in the above-described posture within the end cover 4 is most effectively used to avoid undesired expansion of the end cover 4 or undesired protrusion of the terminal metal member 501. As a result, as the starter axial length is lengthened than the conventional one, the single axis-type starter is mount ed with ease. In the end, together with the shortening of the radial length of the single axis-type starter, the mounting space required around the starter can be remarkably reduced than in the conventional one.

[Sixth Embodiment]

Figure 14:
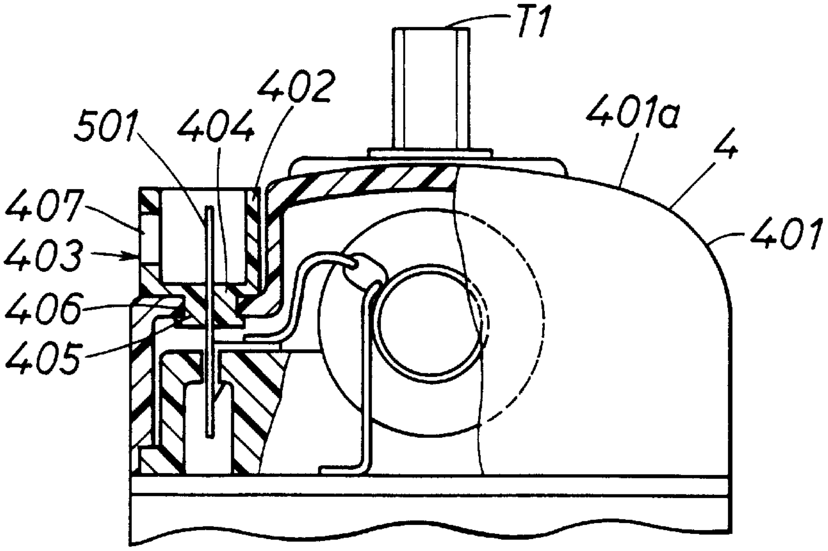
FIG. 14 is a partial sectional view of a rear part of a starter according to the sixth embodiment.

In the sixth embodiment, as shown in FIG. 14, the end cover 4 comprises a cover part 401 made of a hard resin (e.g., phenol resin) and a connector housing part 402 made of a soft resin (e.g., PBT resin). The cover part 401 has on its outer circumferential periphery a stepped or concave part 403 which is in the similar shape as the recess part 41 shown in FIG. 13. The connecting housing part 402 is fitted on the concave part 403 so that the similar end cover as the end cover 4 in FIG. 13 is provided as a whole.

More specifically, the connector housing 402 is formed in a cup shape and is formed a projection 405 on the central part of the outside surface of a bottom part 404. The projection 405 has in its central part a slit through which the terminal metal member 501 is insertable. A through hole 406 is provided in the bottom part of the concave part 403 so that the projection 405 is firmly fitted thereinto.

The connector housing part 402 may be attached in the following manner.

While inserting the terminal metal member 501 into the slit of the projection 405 of the connector housing part 402, the connector housing part 402 is fitted on the concave part 403 and the projection 405 is fitted into the through hole 406. The end of the projection 405 is heat-caulked to fix the connector housing part 402 to the end cover 4.

An engagement hole 407 is opened on the peripheral wall part of the connector housing 402. When the resin housing part of an external connector (not shown) is fitted with the connector housing part 402, a projection (not shown) formed on the out side surface of the resin housing part (not shown) of the external connector is engaged with the engagement opening 407 so that the external connector (not shown) is prevented from detaching.

According to this embodiment, the cover 4 can be made rather rigidly while keeping deformability of the connector housing part 402. It is advantageous from the standpoint of manufacturing that only the shape of the connector housing part 402 may be modified even in the case the shape of the connector housing part 402 is changed in correspondence with the variety of intended uses or types.

[Seventh embodiment]

Figure 15:
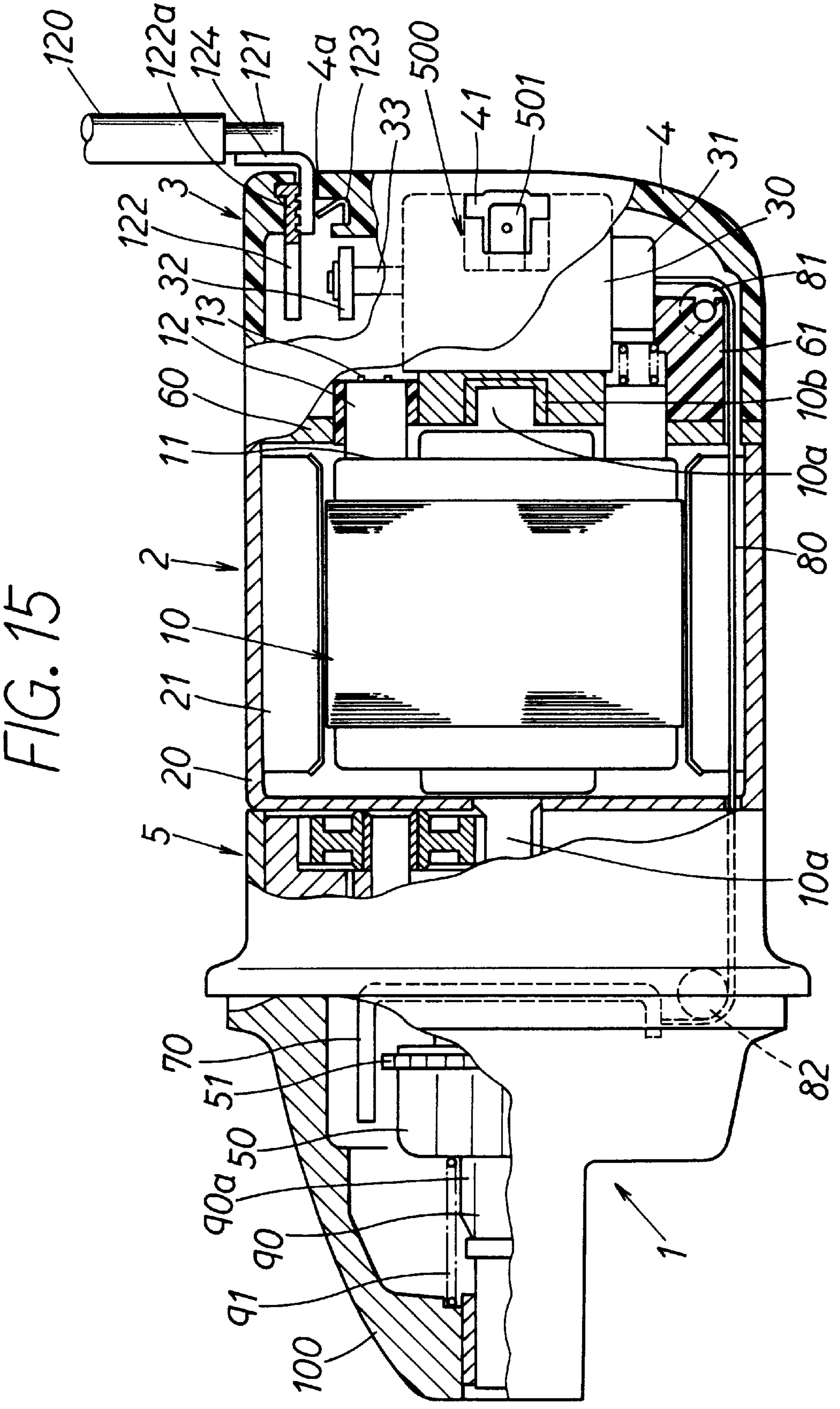
FIG. 15 is a sectional view of a starter according to the seventh embodiment with its main part being shown in cross section.

In this embodiment shown in FIG. 15, the attachability of the battery cable is improved.

A fixed contact 122 of the magnet switch 3 has a base part which is held by the inside end part of the end cover 4, and has a top end part which is protruded axially forwardly. A plate spring 123 is bent into an angled shape in cross section so that its base part is positioned below the fixed contact 122 in the figure and held in position on the plate spring seat formed on the inside end surface of the end cover 4. A plurality of line grooves 122*a* are formed generally perpendicularly to the axial direction on the bottom surface of the base part of the fixed contact 122, i.e., the main surface (line groove surface) which faces the plate spring 123.

A battery cable 120 is connected to the base part of the L-shaped plate terminal part 124 made of a good conductor such as a bronze plate. The top end of the terminal part 124 is inserted into the inside of the end cover 4 through a hole part 4*a* formed in the end surface of the end cover 4 and thereafter is inserted between the top end (biasing part) of the plate spring 123 and the line groove surface of the fixed contact. Thus, the top end part (biasing part) of the plate spring 123 presses the top end part of the terminal part 124 to the line grooves 122*a* of the fixed contact 122.

As a result, the terminal part 124 is electrically connected to the fixed contact 122 and is prevented from coming off from the hole part 4*a*. Further, as the terminal part 124 is formed in the L-shape as described above, the top end part (around connection part) of the battery cable 120 can be positioned perpendicularly to the axial direction. Therefore, after moving the terminal part 124 perpendicularly to the axial direction, the terminal part 124 can be inserted into the hole part 4*a* and thus the space at the rear of the end cover 4 can be saved.

According to the present embodiment, the terminal metal member 501 of the power supply terminal 500 for the solenoid coil 30 is positioned on the concave part of the end cover 4 and the terminal part 124 for connection with the battery cable 120 is formed by bending in the L-shape so that it may be positioned perpendicularly to the axial direction. Therefore, the starter may be constructed with almost nothing protruding rearwardly from the end cover 4. This enables easier mounting of the starter within the limited space in the engine compartment.

A movable contact 32 is fixed to a plunger shaft 33 linked with a plunger 31 and is connected to the positive pole brush 12 through a lead wire (not shown).

It is to be noted that the fixed contact 122, the plate spring 123 and the hole part 4*a* form an insertion fit-type socket part which connects the battery cable 120 having the terminal part 124. That is, in place of the bar-shaped battery terminal protruding rearwardly from the end cover, the battery terminal which is shaped in the insertion fit-type socket and provided inside the end cover 4 in the present embodiment so that the connection work of the battery cable 120 in the limited space can be greatly improved. Further, as the main conductor (terminal) of the insertion fit-type socket part is provided by the fixed contact 122 in this embodiment, the number of component parts as well as assembling work-hours can be reduced.

The present invention having been described above may be modified further in various ways without departing from the spirit of the invention. One such modification may be that the solenoid coil energization interruption structure of the first to fourth embodiments is incorporated in the power supply terminal of the fifth to seventh embodiments.

What is claimed is:

1. A starter comprising:

a motor;

a magnet switch for controlling energization of the motor;

terminal metal member connectable to an external circuit of a starter;

interruption means disposed between the terminal metal member and a solenoid coil of the magnet switch to interrupt an electrical connection between the terminal metal member and the solenoid coil at a temperature rising above a predetermined temperature, the interruption means being in heat conductive contact with the terminal metal member; and a casing abutting the terminal metal member and encasing the interruption means therein.

2. A starter according to claim 1, wherein:

the interruption means includes a thermo breaker which is one of a normally-closed bimetal and PTC thermistor.

3. A starter according to claim 1, wherein:

the casing seals the interruption means.

4. A starter according to claim 1, wherein:

the casing is made at least partly of the terminal metal member.

5. A starter according to claim 1, wherein:

the casing encases at least a part of the terminal metal member.

6. A starter according to claim 1, further comprising:

a heat conductive member made of metal and having one end and the other end, the one end abutting either one of the solenoid coil, a bobbin wound with the solenoid coil and a magnetic circuit member made of a magnetic material adjacent to the bobbin, the other end being supported in the casing.

7. A starter according to claim 1, wherein:

the casing is made of a resin and is fixed to one end of the terminal metal member.

8. A starter according to claim 7, wherein:

the terminal metal member has at said one end thereof a foot part which tightly holds the casing therein.

9. A starter according to claim 7, wherein:

the interruption means includes a pair of bimetal members one of which is connected to the solenoid coil and the other of which is connected to the terminal metal member.

10. A starter according to claim 1, wherein:

the casing is made integrally with the terminal metal member at one end of the terminal metal member and defines a space for encasing the interruption means therein.

11. A starter according to claim 10, wherein:

the interruption means includes a bimetal member connected to the solenoid coil, a first contact member fixed to the bimetal member, and a second contact member fixed to the terminal metal member.

12. A starter according to claim 1, wherein:

the magnet switch includes a bobbin for the solenoid coil, and a metal plate member disposed adjacent the bobbin; and the terminal metal member has at one end thereof a bent part which is held in heat conductive relation with the metal plate member through an electric insulating layer.

13. A starter according to claim 1, further comprising:

a tubular base made of a resin tightly holding one end of the terminal metal member, the interruption means and the casing therein, wherein the terminal metal member has another end extending outward from the tubular base for connection with the external circuit.

14. A starter according to claim 13, wherein:

the casing is made of a resin; and the terminal metal member is sandwiched between the casing and the tubular base and surrounds at one end thereof the casing.

15. A starter comprising:

a pinion disposed engageably with an engine ring gear;

a motor for transmitting a rotating force to the pinion;

a magnet switch disposed axially adjacent to said motor at a side thereof opposite to the pinion of the motor for, at the time of energization of a solenoid coil of the magnet switch, moving the pinion to a side of the ring gear and controlling electric power supply to the motor;

an end cover fixed to the motor for surrounding the magnet switch, the end cover having a recess part formed on an outer surface of the end cover; and a terminal metal member disposed in the recess part for energizing the solenoid coil of the magnet switch, an end of the terminal metal member being positioned axially within a rear end surface of the end cover.

16. A starter according to claim 15, wherein:

the recess part is disposed on the rear end surface of the end cover so that the terminal metal member extends axially.

17. A starter according to claim 15, wherein:

a top end of the terminal metal member for energizing the solenoid coil of the magnet switch is housed within the recess part and is positioned axially inside an axial end surface of the end cover.

18. A starter according to claim 15, wherein:

the recess part holds detachably the resin holder part fixed to a solenoid coil terminal.

19. A starter according to claim 15, further comprising:

an insertion-type socket part into which a battery cable or a battery cable having a terminal part is inserted and connected, the socket part being provided on the end cover.

20. A starter according to claim 19, wherein:

the insertion-type socket part is in contact with the battery cable or the battery cable having the terminal part and has a conductor piece usable as a fixed contact of the magnet switch.

21. A starter comprising:

a pinion disposed engageably with an engine ring gear;

a motor for transmitting a rotating force to the pinion;

a magnet switch disposed axially adjacent to said motor at a side thereof opposite to the pinion of the motor for, at the time of energization of a solenoid coil of the magnet switch, moving the pinion to a side of the ring gear and controlling electric power supply to the motor;

an end cover fixed to the motor for surrounding the magnet switch;

a terminal metal member for energizing the solenoid coil;

a resin holder part having a recess part in which the terminal metal member is positioned;

a cover part surrounding the magnet switch and having a concave part into which the resin holder part is press-fitted; and an end of the terminal metal member being positioned axially within a rear end surface of the end cover.

22. A starter according to claim 21, wherein:

the cover part is made of a first resin and the resin holder part is made of a second resin, said second resin being softer than the first resin.

23. A starter according to claim 21, wherein:

the concave part is disposed on the rear end surface of the end cover so that the terminal metal member extends axially.

24. A starter according to claim 21, wherein:

a top end of the terminal metal member for energizing the solenoid coil of the magnet switch is housed within the concave part and is positioned axially inside an axial end surface of the end cover.

25. A starter according to claim 21, wherein:

the concave part holds detachably the resin holder part fixed to a solenoid coil terminal.

26. A starter according to claim 21, further comprising:

an insertion-type socket part into which a battery cable or a battery cable having a terminal part is inserted and connected, the socket part being provided on the end cover.

27. A starter according to claim 26, wherein:

the insertion-type socket part is in contact with the battery cable or the battery cable having the terminal part and has a conductor piece usable as a fixed contact of the magnet switch.

* * * * *